United States Patent [19]

Tseung et al.

[11] Patent Number: 4,488,578
[45] Date of Patent: Dec. 18, 1984

[54] PREVENTION OF HYDROGEN EMBRITTLEMENT OF METALS IN CORROSIVE ENVIRONMENTS

[75] Inventors: Alfred C. C. Tseung; Ho C. Chan; Nani B. Fouzder; Thurairajah Sriskandarajah, all of London, England

[73] Assignee: National Research Development Corporation, London, England

[21] Appl. No.: 380,936

[22] Filed: May 21, 1982

[30] Foreign Application Priority Data

May 26, 1981 [GB] United Kingdom ............... 8116018

[51] Int. Cl.³ .................. D03D 49/26; B05D 3/02; F16L 9/14
[52] U.S. Cl. .................. 138/146; 427/383.7; 427/386; 427/388.1; 427/409; 427/410; 428/36; 106/14.44; 106/14.45
[58] Field of Search ............ 138/146; 106/14.44, 106/14.45; 148/6.24; 252/387; 427/383.7, 386, 388.1, 409; 428/36, 457, 472, 698; 472/1, 6–8, 19

[56] References Cited

U.S. PATENT DOCUMENTS

| | | | |
|---|---|---|---|
| 2,431,997 | 12/1947 | Rose | 423/511 |
| 3,147,204 | 9/1964 | Shepard et al. | 204/147 |
| 3,973,056 | 8/1976 | Fessler et al. | 138/DIG. 6 |
| 4,040,447 | 8/1977 | Scott | 204/147 X |
| 4,268,579 | 5/1981 | Suzuki et al. | 427/410 X |

FOREIGN PATENT DOCUMENTS

| | | |
|---|---|---|
| 941983 | 11/1963 | United Kingdom . |
| 1014587 | 12/1965 | United Kingdom . |
| 1421708 | 1/1976 | United Kingdom . |
| 1461764 | 1/1977 | United Kingdom . |
| 1556452 | 11/1979 | United Kingdom . |

Primary Examiner—Thurman K. Page
Attorney, Agent, or Firm—Mason Fenwick & Lawrence

[57] ABSTRACT

Metal substrates in corrosive environments, such as gas and oil pipelines, are normally prone to embrittlement caused by absorption of the hydrogen atoms cathodically evolved during various corrosion processes. This is substantially prevented by providing an active substance in the vicinity of the metal substrate, and in electrical contact therewith, the active substance being a sulphide or mixed sulphide of a metal of Group Vb, VIb or VIIb of the Periodic Table or of a rare earth metal, especially $WS_2$ and $MoS_2$. The active substance is preferably applied as or in a coating on the surface of the substrate, with an overcoating of, for example, a thermosetting resin, preferably being employed for mechanical and environmental protection.

37 Claims, 7 Drawing Figures

PREVENTION OF HYDROGEN EMBRITTLEMENT OF METALS IN CORROSIVE ENVIRONMENTS

This invention relates to the protection of metal substrates against corrosion and other related degradative processes.

BRIEF DESCRIPTION OF THE DRAWINGS

FIG. 1a–FIG. 5 represents test specimen used to determine the values of $K_Q$ and fracture energy between the specimen coated according to the invention and the comparison specimen.

Figures 1A, 1B:
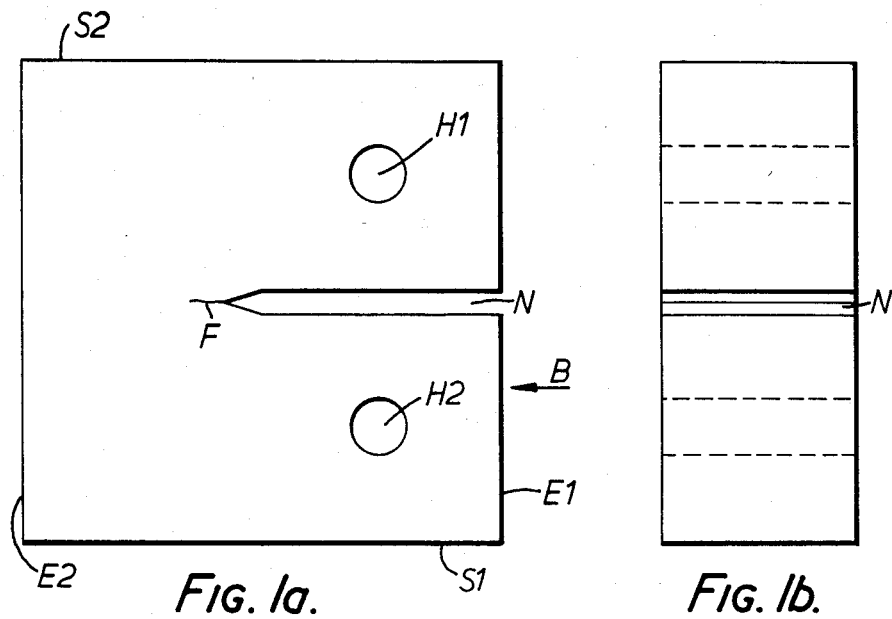

One major problem encountered in offshore oil and gas pipelines is their susceptibility to corrosion, the problem being especially serious in the riser pipes which carry the hot oil or gas from the ocean bed to the underwater pipes which transport the fuel to the shore. The riser pipes are subjected to considerable stress, caused by the oil or gas pressure as well as the pounding action of the waves. Amongst other situations where metal substrates, especially pipes, are subjected to stress as well as corrosive agents there may also be mentioned, for example, the hydraulic lines of high speed aircraft and the pipelines of chemical plants.

The internal corrosion of pipelines and other equipment is encountered in most oil-production and gas-production units. The degree of attack varies from site to site, and also from time to time during the life of the production well and as production procedures and rates are changed, because the corrosion rates and mechanisms are dependent upon many parameters, including, for example, the amount of water entrained in the gas or crude oil, the presence and concentration of $CO_2$ and/or $H_2S$, the pH, the salt content and the presence or absence of oxygen. In general, however, the corrosion can be classified into two types, namely so-called "sweet" corrosion, due to the presence of $CO_2$ and water, and so-called "sour" corrosion, due to the presence of $H_2S$.

The present invention is concerned primarily with protection against sour corrosion, but the invention may be of use in any type of corrosive environment. Moreover, it has also been found that the use of the present invention can in some cases result in a reduction in general corrosion.

A major factor contributing to the deterioration of metal substrates, such as steel pipes, in corrosive environments, especially when under mechanical stress in the presence of sea water and $H_2S$, is embrittlement caused by absorption by the metal of hydrogen atoms cathodically evolved during corrosion processes. Various methods have been proposed or used in attempts to reduce hydrogen embrittlement and other types of corrosion. These include the following, for example:

(a) Design—By eliminating abrupt changes in flow direction, the corrosion caused at local sites is minimized.

(b) Choice of materials—The choice of materials is often constrained by cost and practical considerations. In certain areas chromium steels have been used but mechanical requirements and the possibility of their cracking in high-chloride high-temperature environments restricts their large-scale use.

(c) Coatings—Protective coatings applied to the materials have the disadvantage that, over a period of time, pores and cracks develop and severe localized attack results.

(d) Inhibitors—The use of inhibitors is favoured in some respects. The inhibitors commonly used are basically organic compounds incorporating active polar groups, usually containing sulphur, nitrogen or phosphorus atoms, e.g. alkylamines or amides. The inhibitors absorb on the metal surface and retard the rate of electrochemical reactions, which contribute to corrosion. The inhibitors, however, have to be added either continuously or at frequent intervals, and they are relatively ineffective in sour pipes because they are unable to prevent the reaction between $H_2S$ and steel which causes the cathodic evolution of hydrogen atoms.

British patent application Ser. No. 80.38123 (A.C.C. Tseung, A. I. Onuchukwu and H. C. Chan; filed Nov. 27, 1980; published under Ser. No. 2 064 587 A on June 17, 1981; corresponding to U.S. patent application Ser. No. 209,481 filed Nov. 24, 1980 now U.S. Pat. No. 4,336,754), describes and claims a method of protecting a metal substrate in a corrosive environment against hydrogen embrittlement, which comprises providing, in the vicinity of the substrate and in electrical connection therewith, an active substance that has a low overpotential for the cathodic evolution of hydrogen and that is a sulphide or mixed sulphide. Preferred sulphides mentioned in that application are iron sulphide FeS, and mixed sulphides of the general formula $$A_xB_{(4-2x)}S_{(4-y)}O_y$$

in which x has a value from 0.05 to 1.95, y has a value from 0 to 0.4, and A and B are any different two metals selected from Co, Ni, Fe and Mn, e.g. Co and Ni; $NiCo_2S_4$ being especially preferred.

In accordance with the invention described and claimed in British patent application Ser. No. 80.38123, it was found that a coating of an active sulphide of the type referred to above, for example $NiCo_2S_4$, is more active for hydrogen evolution than is steel or another metal to be protected and that thus penetration of hydrogen atoms into the steel or other metal is significantly reduced with a resultant significant decrease in hydrogen embrittlement and stress corrosion cracking.

That invention has led to significant advantages, but it has now been found that, in certain environments, certain sulphide coatings may prove to be insufficiently stable, which can result in complications.

The present invention now provides a method of protecting a metal substrate in a corrosive environment against hydrogen embrittlement, which comprises providing, in the vicinity of the substrate and in electrical connection therewith, an active substance comprising a sulphide or mixed sulphide of at least one element selected from Groups Vb, VIb and VIIb of the Periodic Table and rare earth metals.

The present invention also provides a metal substrate for use in a corrosive environment, said substrate having, in electrical connection therewith, an active substance comprising a sulphide or mixed sulphide as defined above.

It has been found that sulphides, mixed sulphides and mixtures of sulphides which comprise at least one transition element selected from Groups Vb, VIb and VIIb of the Periodic Table (namely the groups V, Nb, Ta; Cr, Mo, W; and Mn, Tc, Re) and/or at least one transition element selected from the rare earth metals (also known as 'Lanthanides', namely the elements of atomic numbers 57 to 71) show particularly advantageous results when used as active substances in the prevention of hydrogen embrittlement of iron, steel and other metals.

The active substance used according to the present invention is advantageously a sulphide or mixed sulphide of at least one element selected from Groups Vb, VIb and VIIb of the Periodic Table and rare earth metals, with the proviso that, if the active substance is a mixed sulphide comprising manganese, it is not one of the general formula $$A_xB_{(4-2x)}S_{(4-y)}O_y$$

in which x has a value from 0.05 to 1.95, y has a value from 0 to 0.04, one of A and B denotes manganese and the other denotes cobalt, nickel or iron.

Preferably the active substance used according to the invention is a sulphide or mixed sulphide of at least one element selected from Groups Vb, VIb and VIIb of the Periodic Table and rare earth metals, excepting mixed sulphides of manganese with cobalt, nickel or iron.

In particular, it has been found that those sulphides, especially $WS_2$ and $MoS_2$, which are electrically conductive, are considerably more resistant to attack in an acidic environment than are nickel and cobalt sulphides and the mixed sulphide $NiCo_2S_4$. As will be seen from the results given in the examples below, the sulphides used according to the present invention exhibit extremely desirable properties with regard to their general stability, their ability to prevent hydrogen embrittlement, and also their ability to prevent general corrosion.

For the sake of convenience, the present invention will now be described especially in relation to tungsten sulphide $WS_2$ and molybdenum sulphide $MoS_2$, but it will be appreciated that the present invention is not limited to the use of those particular sulphides. In particular, it is thought that mixed sulphides and mixtures of sulphides containing molybdenum and/or tungsten will also be effective, especially such mixed sulphides also containing one or more elements selected from nickel, iron, manganese, cobalt and the rare earth metals. In addition, it is believed that other sulphides and mixed sulphides containing elements selected from Groups Vb, VIb and VIIb, for example chromium sulphide, niobium sulphide and tantalum sulphide, used either alone or in admixture with each other or with other metal sulphides, will be effective in preventing hydrogen embrittlement within the context of the present invention.

Both $WS_2$ and $MoS_2$ are commercially available, and $MoS_2$ in particular is readily available because of its use as an additive in lubricants. Moreover, both $WS_2$ and $MoS_2$, which have a hexagonal crystal structure, can be vacuum-ground, for example, in a vibratory ball mill, in order to increase their surface area, although it has been found that the surface area of commercially available $WS_2$ and $MoS_2$ is often sufficient for the purposes of the present invention, without further grinding.

The metal sulphide used according to the present invention should advantageously have a relatively high specific surface area. In particular, it should preferably have a specific surface area of at least 1 $m^2/g$, more preferably at least 2 $m^2/g$, and especially at least 4 $m^2/g$.

The pseudo-exchange currents for hydrogen evolution on electrodes coated with these sulphides are significantly higher than those for EN42 steel and, although short-term corrosion tests indicate that the corrosion rates using these active sulphides may initially—that is to say, in the short term—be somewhat greater than those for uncoated steel, those rates may be reduced to a comparable level by correct selection of the sulphide loading and, because of the very significant increase in pseudo-exchange current, which is, for example, from 20 to 25 times higher than that for an untreated steel substrate, the active sulphides will still effectively act as the preferential cathode for hydrogen evolution even at relatively low loadings of 5 mg of sulphide per $cm^2$ of metal surface or less.

In addition, long-term tests indicate that, in the longer term, corrosion itself is also reduced by the use of these substances (because, it is thought, of the nature of the product which forms in the corrosive mechanism) and chemical and X-ray fluorescence analyses indicate that the sulphides used according to the present invention are very much more stable than, for example, $NiCo_2S_4$.

It is therefore believed that the sulphides defined above will prove to be extremely useful as active substances in the protection of metal substrates, especially steel pipelines and, for example, the legs of oil rigs.

It is thought that the loading of the active sulphides will preferably lie in the range of from 1 to 15 mg of sulphide per $cm^2$ of metal surface, especially from 2 to 10 $mg/cm^2$, more especially from 4 to 6 $mg/cm^2$. The actual loading necessary in any particular case will, however, depend on the activity of the sulphide used, which in turn, depends, inter alia on the specific surface area of the sulphide. The real surface area of the sulphide (that is to say, the sum of the surface areas of the individual particles) should advantageously be substantially greater than the geometric surface area of the metal substrate to be protected. In particular, the said real surface area should preferably be at least 5 times, especially at least 10 times, the said geometric surface area.

The active sulphide, on which hydrogen is preferentially cathodically evolved, may be applied in a variety of forms. For example, it may be applied in the form of, or as a coating on, a separate member, e.g. an electrode, which is in electrical connection with the metal substrate. Alternatively, it may be applied as a coating on the metal substrate, or it may be incorporated in a coating composition coated on the metal substrate. In yet other embodiments, the active sulphide may be formed by electroplating on the metal substrate or on an electrically connected member. Combinations of these and other methods of application may also be employed. The active sulphide may, of course, be provided before the metal substrate is exposed to the corrosive environment (the term "corrosive environment" as used herein meaning an environment where chemical, or more particularly electrochemical, reactions leading to hydrogen embrittlement are liable to occur) and/or may be provided whilst the metal substrate is so exposed.

The active sulphide must have an electrical connection to the substrate. In most cases, that will be achieved by providing it in the form of a coating or as a separate element which is in continuous electrical connection with the substrate. However, in some cases it may be sufficient to add the active sulphide as a powder dispersed in a fluid which passes over the surface of the metal substrate, especially a liquid flowing in a closed circuit within a pipe, because the powder particles will from time to time come into contact with the walls of the pipe.

In various preferred embodiments of the present invention the active sulphide, in particulate form, preferably finely divided particulate form, is dispersed in a, preferably chemically inert, binder, especially a fluorinated olefin polymer, for example polytetrafluoroethylene (PTFE) or another fluorinated ethylene polymer (FEP), for the purposes of coating it on the surface of the metal substrate. Such coating materials typically comprise the polymer binder in an amount of from 10 to 100%, preferably from 20 to 60%, by weight, based on the weight of the active sulphide.

The coating on the substrate should advantageously have a thickness of at least 0.0001 cm, preferably within the range of from 0.001 cm to 0.1 cm, and especially within the range of from 0.001 cm to 0.01 cm.

The materials may be assembled to form an "electrode", for example by painting a dispersion onto a suitable support such as a nickel screen and then air-drying and curing; such "electrodes" may conveniently be employed in the protection of hydrogen embrittlement of a substrate which is being electroplated. However, the technique will not, in general, be suitable for use in the protection of pipelines and, in such applications, it is preferred to provide the active sulphide in a coating applied directly onto the surface to be protected.

The active sulphide may be applied as an ingredient in a paint or similar coating composition, including a polymer dispersion, as described above, (care being taken that it does not become electrically insulated within the composition so that electrical continuity is lost). Alternatively, the active sulphide may be applied by electrophoretic deposition, such a technique being especially suitable for the internal coating of pipes on an industrial scale.

It will, of course, be appreciated that other methods of applying the active sulphide, either per se or as part of a coating composition, may appropriately be used.

In the case of pipes, such as oil or gas pipelines, the coating of the active sulphide is preferably applied to the internal surface of the pipe, although it may be applied externally.

In some applications, the active sulphide may simply be added to the fluid flowing through the steel or other metal pipe and the present invention accordingly contemplates the addition of such an ingredient as a method of forming the sulphide in situ during the normal operation of the apparatus comprising the metal substrate which is to be protected even though, in general, it is preferred to apply the active sulphide to the substrate before it is subjected to the corrosive and embrittling environment.

In most applications, especially when the metal substrate is an iron or steel substrate, it will be preferable to provide an additional protective, preferably non-conducting and impervious, coating over the coating comprising the active sulphide. Apart from providing desirable physical protection for the coating of the active sulphide, the additional layer has the further advantage of minimizing the cathodic surface exposed when, as sometimes happens, a crack develops in the active coating thus exposing the underlying metal surface. This protective layer thereby substantially reduces the risk of wide-spread corrosion and/or embrittlement developing from a small crack in the coating.

The protective coating may comprise any of the materials conventionally employed for the protection of pipelines, including thermosetting and thermoplastics polymers. Especially preferred are coatings comprising epoxy resins, for example fusion-bonded epoxy resin coatings such as "Scotchkote" (Trade Mark) sold by 3M Corporation. However, other materials, such as polyester resins, polyamides, polyimides, fluorocarbons, and polyolefins, may be employed. The coatings may be applied by conventional methods, including, in certain applications, the use of preformed heat-recoverable tubes and sleeves, for example wrap-around sleeves, which shrink down about the pipes when heated to form a tight protective environmental seal.

The following examples illustrate the invention. All ratios and percentages mentioned in the examples are calculated by weight unless otherwise stated.

EXAMPLE 1

In this example, the stability of two active sulphide materials used according to the present invention, namely $MoS_2$ and $WS_2$, is compared with the stability of $NiCo_2S_4$. The sulphur content and the surface area of the three active sulphur samples used are summarised in Table 1.

TABLE 1

| Sample | Theoretical S content | Actual S content | Initial surface area $(m^2/g)$ | Surface area after grinding $(m^2g)$ |
|---|---|---|---|---|
| $NiCo_2S_4$ | 42.07% | 40.77% | 8.22 | 8.22 |
| $MoS_2$ | 40.44% | 34.60% | 5.01 | 8.6 |
| $WS_2$ | 25.80% | 20.52% | 6.07 | 11.05 |

The $WS_2$ and $MoS_2$ samples were obtained from Alfa Products Division, Ventron Corp., Danvers, Mass., U.S.A., and were vacuum groud in a vibratory ball mill to increase their surface areas. The $NiCo_2S_4$ sample was prepared by co-precipitation of nickel cobalt nitrate solution with potassium polysulphide by the following method as described in Example 1 of British patent application No. 81.34621 (A.C.C. Tseung, P. Rasiyah and J. Antonian; filed Nov. 17, 1981; to be published under Serial No. 2 008 903 A on June 16, 1982; corresponding to U.S. patent application Ser. No. 320 774 filed Nov. 12, 1981; claiming priority from British patent application No. 80.36847, filed Nov. 17, 1980, now abandoned):

50 g of $K_2S$ (BDH potassium polysulphide) were dissolved in 150 ml of distilled water. The solution was then filtered. 15g of $Ni(NO_3)_2.6H_2O$ and 30 g of $Co(NO_3)_2.6H_2O$ were dissolved in 50 ml of distilled water. The polysulphide solution was then added to the mixed nitrate solution with continuous stirring. This produced about 15 g of $NiCo_2S_4$, which was filtered off and dried under $N_2$ at 125° C. overnight.

Electrodes were prepared by mixing the respective sulphides with a fluoroethylene-propylene polymer (FEP) dispersion (obtained from ICI Plastics), the ratio of active sulphide to FEP being 1:1 for $NiCo_2S_4$ and 0.85:1 for $WS_2$ and $MoS_2$. The resulting mixtures obtained were each homogenised using a magnetic stirrer and were then painted onto 100 mesh (British Standard) nickel screens. Each painted layer was dried with a hair dryer and, when the screen was uniformly covered, the electrode was pressed at 0.8 kN/cm² for three minutes and then cured at 300° C. for one hour in a stream of nitrogen. The catalyst loading of the electrodes was 17 mg/cm² for the $NiCo_2S_4$ electrode, 19 mg/cm² for the $MoS_2$ electrode and 22 mg/cm² for the $WS_2$ electrode.

In order to evaluate the stability of the electrodes in the various experiments described below, two analytical methods were used to determine their sulphur content before and after use:

(a) combustion of the sample followed by analysis of the sulphur content, and (b) X-ray fluorescence.

First of all, two simple experiments were undertaken in order to establish that $NiCo_2S_4$ was susceptible to corrosion in acidic environments. In these experiments a $NiCo_2S_4$ test electrode was employed together with a platinum counter electrode using 3.5% NaCl as the electrolyte. The separation of the electrodes was between 1 and 2 cm. When the electrical circuit was completed, the $NiCo_2S_4$ came into contact with the hypochlorite (or hypochlorous acid) produced in the counter-electrode region and was soon found to show signs of physical disintegration and dissolution. This was additionally confirmed by bubbling chlorine gas into a sodium chloride solution in which an $NiCo_2S_4$ test electrode was immersed.

On the other hand, when the same electrochemical test was carried out employing a U-tube, so that the cathode/anode separation was about 10 cm, there was no sign of deterioration or dissolution of the $NiCo_2S_4$, even when it was polarised at currents of up to 10 mA/cm$^2$ for an hour.

In a typical corrosion situation very little acid will be produced, because of the low current density, and anodic corrosion of steel will probably be the dominant mechanism. For this reason, therefore, further tests were carried out using a two-compartment cell in which the compartments were separated by a Nafion membrane ("Nafion" is a Trade Mark for a perfluorosulphonated polymer obtained from E. I. du Pont de Nemours & Co.) so as to ensure that very little chlorine or hypochlorite reached the cathode compartment. The three electrodes were each subjected for 12 hours to a cathodic current density of 500 mA/cm$^2$ at 60° C. in a NACE solution (5% NaCl+0.5% acetic acid), in the absence and in the presence of $H_2S$. The sulphur content of each electrode (based on the sulphide/FEP mixture) was determined by X-ray fluorescence before and after the tests. The results are shown in Table 2.

TABLE 2

| Material | Before test | After test without $H_2S$ | After test with $H_2S$ |
|---|---|---|---|
| $NiCo_2S_4$ | 31.36% | 4.68% | 10.84% |
| $WS_2$ | 15.78% | 15.60% | 16.00% |
| $MoS_2$ | 26.61% | 23.14% | 24.88% |

Those results, indicate that $NiCo_2S_4$ is far less stable than are both $WS_2$ and $MoS_2$.

In this respect, it should be noted that, if the active sulphides lose significant amounts of sulphur upon cathodic polarisation, the sulphide/polymer coatings are liable to become porous, which not only would render the coating less effective but would also increase corrosion pitting and enhance anodic dissolution because of the increase in the surface area of the cathode. It should also be stressed, however, that the stability of $NiCo_2S_4$ is liable to be much improved at low over-potentials, e.g. at a polarisation of from 1 to 2 mA/cm$^2$, corresponding to actual corrosion conditions.

EXAMPLE 2

This example illustrates the activities of the three sulphides used in Example 1.

Electrodes were prepared in a manner similar to that described in Example 1. A three-compartment glass test cell was used, with a 3 cm×2 cm platinum mesh counter electrode as the anode and a saturated Calomel electrode (SCE) as the reference electrode. The working electrode compartment and the secondary (counter) electrode compartment were separated from one another by means of a Nafion membrane, in order to prevent diffusion of hypochlorous acid to the cathode compartment. In order to facilitate passage of $H_2S$ to the working electrode compartment, an agar salt bridge was employed in the reference electrode compartment. The outgoing $H_2S$ gas was removed by bubbling it through a solution of lead acetate.

The SCE reference electrode was calibrated against two other similar electrodes every day to a potential difference of ±2 mV and, because initial experiments indicated that reproducible results were obtainable only by using precathodised electrodes, the active-sulphide-coated electrodes were initially cathodised for about 12 hours at 500 mA/cm$^2$ at 60° C. Fresh NACE solution was used for each experiment and the solution was purged for 30 minutes with nitrogen gas before the working electrode was placed in the test cell. The nitrogen purging was continued throughout those experiments carried out in the absence of $H_2S$ but, for the experiments carried out in the presence of $H_2S$, the initial purging with nitrogen was followed by bubbling $H_2S$ through the NACE solution for 30 minutes in order to saturate the electrolyte and the $H_2S$ bubbling was then continued for the duration of the experiment.

Voltage-current measurements were carried out galvanostatically in order to evaluate the hydrogen evolution performances of the various electrodes and, in order that only 1 cm$^2$ of each electrode was exposed to the electrolyte, the current-collector lead was masked by wrapping it with Teflon tape ("Teflon" is a Trade Mark for a polytetrafluoroethylene polymer obtained from E. I. du Pont de Nemours & Co.). The electrodes were placed at a distance of about 2.5 mm from the tip of the Luggin capillary.

The half-cell potentials were iR corrected (i = current density, R = resistance) over the complete current range and a period of 5 minutes was allowed for the potential to become steady for each measurement. The potential was raised from the rest value in 10 mV steps and the current density was noted every 30 seconds. Current-/potential measurements were obtained at temperatures of 25° C., 40° C., 60° C. and 80° C. over a current density range for hydrogen evolution of 0.5 to 15 mA/cm$^2$ and current/potential curves and Tafel slopes (for both cathodic and anodic polarisation) were drawn for the three sulphide-coated electrodes as well as for an EN42 steel electrode which had not been electrochemically pretreated.

The reversible potential for hydrogen ($E_{rev,H_2}$) was calculated according to the equation $$E_{rev,H_2} = -\frac{2.303RT}{F} pH_2 - \frac{2.303RT}{F} \log pH_2$$

($R$ = gas constant, $F$ = Faraday's constant, $T$ = temperature in Kelvin, $pH_2$ = partial pressure of hydrogen) and was used to define the over-potential for each of the electrodes tested.

The apparent activation energies for hydrogen evolution $((\Delta H)_E)$ were calculated using the equation $$(\Delta H)_E = -2.3R \left[ \frac{d\log i}{d(1/T)} \right]_E$$

($\Delta H$ = heat of reaction, $E$ = potential, $i$ = current density, $R$ and $T$ as above) such activation energies being calculated using the current value at $-620$ mV (vs SCE) for the sulphides and $-740$ mV (vs SCE) for the EN42 steel.

The apparent activation energies for the four electrodes are given in Table 3.

TABLE 3

| Electrode | Presence of $H_2S$ (cal) | Absence of $H_2S$ (cal) |
| --- | --- | --- |
| $NiCo_2S_4$ | 1411 | 1050 |
| $MoS_2$ | 1721 | 2240 |
| $WS_2$ | 1455 | 2542 |
| EN42 steel | 2210 | 3340 |

It will be seen that the activation energies in the absence of $H_2S$ generally follow the pattern:

Steel > $MoS_2 \sim WS_2$ > $NiCo_2S_4$ but that, in the presence of $H_2S$, the apparent activation energy for hydrogen evolution increased on the $NiCo_2S_4$ electrode whereas it decreased on the other electrodes. Thus, although these tests show $NiCo_2S_4$ to be more active than $MoS_2$ and $WS_2$ in the absence of $H_2S$, the latter two compounds compare favourably with $NiCo_2S_4$ in the presence of $H_2S$.

By drawing the anodic and cathodic Tafel slopes for the EN42 steel electrode and taking the points of intersection of the anodic and cathodic lines, the corrosion potentials and corresponding corrosion currents were obtained and are shown in Table 4.

TABLE 4

| | Presence of $H_2S$ | | Absence of $H_2S$ | |
| --- | --- | --- | --- | --- |
| Temperature | Potential (mV vs SCE) | Current ($\mu$A) | Potential (mV vs SCE) | Current ($\mu$A) |
| 25° C. | −641 | 105 | −594 | 57 |
| 40° C. | −651 | 324 | −596 | 115 |
| 60° C. | −662 | 813 | −601 | 535 |
| 80° C. | −670 | 1778 | −608 | 951 |

It will be seen that the corrosion potential becomes more cathodic with increase in temperature and that the corrosion potentials are generally more cathodic in the presence of $H_2S$, presumably due to a shift in the reversible potential of steel.

The pseudo-exchange current densities of the electrodes are shown in Table 5, but it is important to note that the real surface areas of the electrodes have not been allowed for.

TABLE 5

| | $NiCo_2S_4$ | | $MoS_2$ | | $WS_2$ | | EN42 steel | |
| --- | --- | --- | --- | --- | --- | --- | --- | --- |
| Temperature | Presence of $H_2S$ (mA/cm$^2$) | Absence of $H_2S$ (mA/cm$^2$) | Presence of $H_2S$ (mA/cm$^2$) | Absence of $H_2S$ (mA/cm$^2$) | Presence of $H_2S$ (mA/cm$^2$) | Absence of $H_2S$ (mA/cm$^2$) | Presence of $H_2S$ (mA/cm$^2$) | Absence of $H_2S$ (mA/cm$^2$) |
| 25° C. | 0.050 | 0.191 | 0.060 | 0.050 | 0.032 | 0.047 | 0.0021 | 0.00054 |
| 40° C. | 0.056 | 0.200 | 0.095 | 0.118 | 0.133 | 0.170 | — | — |
| 60° C. | 0.060 | 0.220 | 0.208 | 0.160 | 0.153 | 0.210 | — | — |
| 80° C. | 0.069 | 0.248 | 0.270 | 0.331 | 0.198 | 0.250 | — | — |

It can be seen from the results shown in Table 5 that the sulphide-coated electrodes are considerably more active than steel. It would appear that the active sulphides give an exchange current which is from 15 to 30 times higher than that for uncoated steel at 25° C. when tested in the presence of $H_2S$ and from 80 to 360 times higher when tested in the absence of $H_2S$ and it can be expected that this type of relationship will be valid at higher temperatures. Also, it can be seen that the current densities, and thus the activity, in the presence of $H_2S$ are generally higher for $MoS_2$ and $WS_2$ than they are for $NiCo_2S_4$, especially at higher temperatures.

Finally, Table 6 summarises the results obtained from Evans diagrams incorporating the anodic and cathodic polarisation curves for EN42 steel and the active sulphides at various temperatures and in the presence and absence of $H_2S$, and shows the enhancement of corrosion currents and corrosion potentials (vs SCE) when the sulphide electrodes are connected to a steel membrane in a NACE medium.

TABLE 6

| | Steel + $NiCo_4S_4$ | | | | Steel + $MoS_2$ | | | | Steel + $WS_2$ | | | |
| --- | --- | --- | --- | --- | --- | --- | --- | --- | --- | --- | --- | --- |
| | Absence of $H_2S$ | | Presence of $H_2S$ | | Absence of $H_2S$ | | Presence of $H_2S$ | | Absence of $H_2S$ | | Presence of $H_2O$ | |
| Temperature | Pot. (mV) | Cur. ($\mu$A) | Pot. (mV) | Cur. ($\mu$A) | Pot. (mV) | Cur. ($\mu$A) | Pot. (mV) | Cur. ($\mu$A) | Pot. (mV) | Cur. ($\mu$A) | Pot. (mV) | Cur. ($\mu$A) |
| 25° C. | −494 | 600 | −588 | 950 | −514 | 395 | −584 | 1180 | −520 | 320 | −593 | 850 |
| 40° C. | −509 | 1060 | −606 | 1950 | −517 | 850 | −604 | 2095 | −527 | 678 | −604 | 2160 |
| 60° C. | −548 | 2780 | −612 | 4400 | −554 | 2220 | −621 | 3100 | −559 | 1930 | −619 | 3350 |
| 80° C. | −564 | 4525 | −639 | 5000 | −569 | 3780 | −632 | 7800 | −575 | 2910 | −639 | 5200 |

It will be seen from Tables 4 and 6 read together that there is a significant increase in corrosion current and corrosion potential for the sulphide-coated electrodes at the loadings employed (17 to 22 mg/cm$^2$) as compared with a steel electrode. In addition, those results show that the corrosion rate increases with temperature, albeit at a faster rate in the case of a steel/steel couple, so that at 80° C. the corrosion rate is typically about three times higher for the active sulphide-coated electrode. However, bearing in mind the substantially higher pseudo-exchange current densities, it can be predicted that the corrosion rate can be reduced to a comparable level by reducing the loading of the sulphide without losing effectiveness in prevention of hydrogen embrittlement (as shown in Example 3 below) and, in any case, the corrosion performance over longer periods appears to be extremely satisfactory (as shown in Example 6 below).

EXAMPLE 3

Electrodes were prepared as described in Example 1 above but using loadings of from 5 to 8 mg/cm$^2$ as indicated in Table 7. Evans diagrams were again drawn, as described in Example 2, and the predicted corrosion potentials and corrosion currents for the electrodes of Example 2 were calculated. Table 7 summarises the ratios of predicted corrosion currents between an EN42 steel/sulphide couple and a steel/steel couple.

TABLE 7

| Electrode | 25° C. | | 60° C. | |
| --- | --- | --- | --- | --- |
| | Absence of H$_2$S | Presence of H$_2$S | Absence of H$_2$S | Presence of H$_2$S |
| Steel/NiCo$_2$S$_4$ (17 mg/cm$^2$) | 10.5 | 9.04 | 5.2 | 5.4 |
| Steel/NiCo$_2$S$_4$ (5 mg/cm$^2$) | 8.07 | 7.10 | 3.94 | 3.99 |
| Steel/MoS$_2$ (19 mg/cm$^2$) | 6.92 | 11.2 | 4.14 | 4.10 |
| Steel/MoS$_2$ (5 mg/cm$^2$) | 5.22 | 5.57 | 3.81 | 2.82 |
| Steel/WS$_2$ (22 mg/cm$^2$) | 5.61 | 8.09 | 3.60 | 4.12 |
| Steel/WS$_2$ (8 mg/cm$^2$) | 5.52 | 7.28 | 2.52 | 2.37 |

It will be seen that there is a significant decrease in corrosion currents, and thus in the degree of corrosion, at the lower sulphide loadings as compared with the higher loadings. Moreover, it will be seen that the MoS$_2$ and WS$_2$ coated electrodes in general show lower corrosion rates than do the NiCo$_2$S$_4$ coated electrodes, and that, at 60° C. in the presence of H$_2$S, the corrosion rates for the low-loading MoS$_2$ and WS$_2$ coated electrodes are only from 2 to 3 times higher than that for a steel/steel couple.

EXAMPLE 4

Hydrogen diffusion studies were carried out, as described in Example 1 of British patent application No. 80.38123 referred to above, in order to assess the effectiveness of an FEP-bonded MoS$_2$ (unground) electrode at various loadings at room temperature and compare it with that of a PTFE-bonded NiCo$_2$S$_4$ electrode as used in the said example. The studies were carried out in NACE solution without an additional cathodic charging current, so that the cathodic H$_2$ evolution reaction was dictated only by the corrosion processes occurring on the steel surface. It was found that there were significant reductions in H$_2$ diffusion currents using an NiCo$_2$S$_4$ coating at 18 mg/cm$^2$ and an MoS$_2$ coating at 17 mg/cm$^2$, and that the effect was still apparent for an MoS$_2$ coating at loadings of 5 mg/cm$^2$, 8 mg/cm$^2$ and 11 mg/cm$^2$.

EXAMPLE 5

Test coupons of G1 special steel (equivalent to EN30B steel, which has a known K$_{ISCC}$ of about 11.5 MN.m$^{-1.5}$) were notched, heat treated at 800° C., oil-quenched, tempered at 200° C., and polished. Fatigue cracks not longer than 3 mm were then developed from the notches (which had a V-shaped end with a root radius of not more than 0.1 mm) by the application of a cyclic load. The fatigue crack lengths were measured using a metallurgical microscope at 100× magnification.

Using a stress corrosion testing machine, a load was applied on each test coupon and comparative tests were carried out between untreated coupons and those connected electrically to an MoS$_2$ (ground - surface area as given in Table 1) coated electrode (loading 5 to 6 mg/cm$^2$).

The times to failure at three different stress intensity levels were measured automatically by the clock built into the stress corrosion testing machine. In each case the failure time was higher when the MoS$_2$ electrode was electrically connected to the specimen.

The tests were carried out in NACE media saturated with H$_2$S, as in Example 1.

EXAMPLE 6

EN42 steel coupons were partially coated with MoS$_2$ (unground)/Teflon 120 FEP at a loading of 5.1 mg/cm$^2$ by the method described in Example 2. The coupons were then tested, again as in Example 2, in NACE solution saturated with H$_2$S at 60° C.

The condition of the various specimens was measured after various time intervals both with regard to weight loss and appearance.

It was found that the weight loss, compared with an untreated steel coupon, after 100 hours, was greater by a factor of 1.80. However, after 200 hours this decreased to a factor of 0.70 and, after 500 hours, to 0.54.

That is to say, over long-term testing, the corrosion of the coupons was significantly reduced when they were coated with MoS$_2$.

It would appear that iron sulphide formed on the corroded surface can give some protection from further corrosion in the case of the coated coupons but not for the uncoated coupons. This difference can possibly be explained by the fact that the crystallite size of the iron sulphide film formed on the uncoated coupons, as measured by using a scanning electron microscope, appears to be smaller on the uncoated coupons than on the partially coated coupons, presumably because, on the latter, the anodic and cathodic areas are well separated so that the iron sulphide crystals can grow freely and continuously over the steel surface to form a dense protective film.

This theory is, it is believed, supported by the fact that, when similar tests were carried out in the presence of a known corrosion inhibitor, dicyclohexylamine, the weight loss reduction of the coated samples was much less (the relevant factor after 500 hours being 0.91 as opposed to 0.54). It is thought that this is because the corrosion inhibitor is absorbed onto the surface of the steel thereby reducing the number of active reaction centres and preventing the formation of a dense compact protective iron sulphide film.

In all of these tests, however, there appeared to be very little change in the morphology of the MoS$_2$/FEP coating after 500 hours and X-ray fluorescence analysis showed no practical change in its chemical composition.

EXAMPLE 7

Test coupons of API 5LX 65 pipe steel were notched, and then fatigue cracks were developed from the notches by the application a cyclic load. The resulting precracked tension specimens (CTS), each measuring 31.5 mm (along the end faces E1, E2)×32.0 mm (along the side faces S1, S2)×13 mm high, are illustrated in FIG. 1a (plan view) and FIG. 1b (end view of face E1, as shown by arrow B in FIG. 1a). Each specimen includes a notch N (18 mm long×1.5 mm wide) centrally situated in the end face E1, an initial fatigue crack F, and holes H1 and H2 for clamping the specimen in the testing machine as described below.

The initial fatigue crack lengths were measured using a metallurgical microscope.

Figures 2A, 2B:
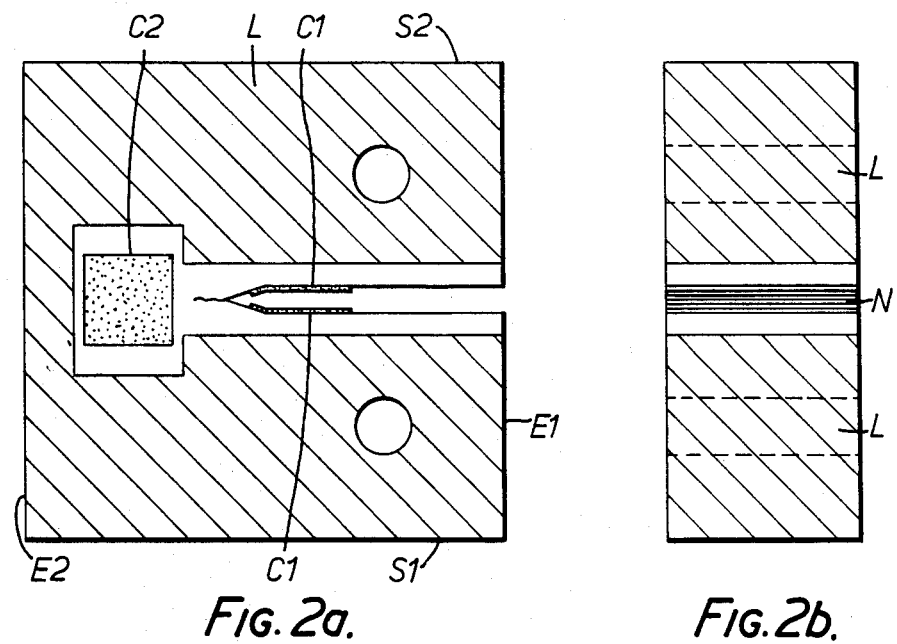

One of the specimens was then provided, according to the invention, inside the notch and also on each of the two major faces, with coatings C1 and C2 respectively, as shown in FIG. 2a, the coatings comprising ball-milled $MoS_2$ (surface area as given in Table 1) and FEP in a ratio of 1:0.85, the coatings C1 each extending about 7 mm along the respective side wall of the notch N for the whole height of the notch and the edge of each coating C1 nearer the end face E1 being about 10 mm therefrom, and the coating C2 measuring 6 mm×6 mm and being centrally situated between the side faces S1, S2 and the edge nearer the end face E2 being 4 mm therefrom. The specimen was also provided on both major faces (as shown in FIG. 2a), on the end face E1 (as shown in FIG. 2b), and over the whole of the end face E2 and both side faces S1 and S2, with a coating L of G.371 Lacomit Varnish (obtained from Agar Aids, Stansted, Essex, England), the coating L extending to 1.5 mm from the side walls of the notch N on the two major faces and on the end face E1 and to within 2 mm from the side edges of the coating C2.

Figure 3:
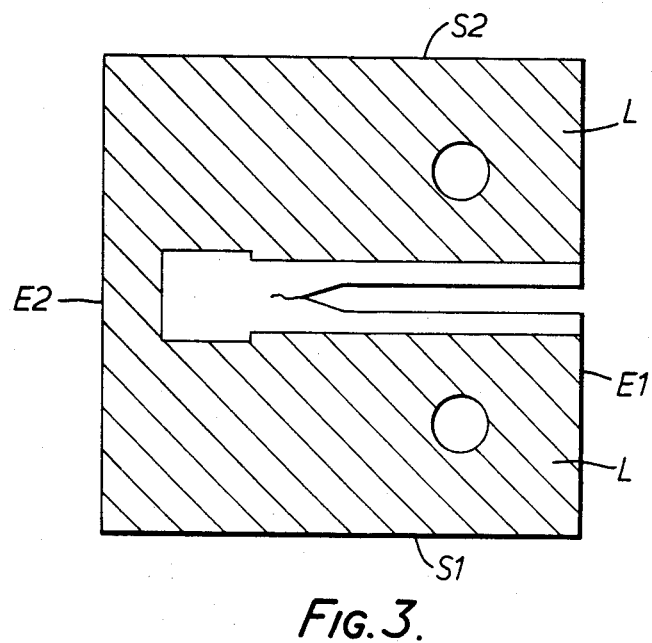

A second specimen, which was used for comparison purposes, was not provided with any $MoS_2$/FEP coating, but only with a Lacomit coating L, which on the two major faces was as illustrated in FIG. 3 (extending over the whole of each face except for the region 1.5 mm either side of the notch N and the region 6 mm×6 mm corresponding to that where the coating C2 is situated on the first specimen), and on the end faces E1, E2 and the side faces S1, S2 was as described above for the first specimen.

Each specimen in turn was then clamped, inside a cell containing NACE solution saturated with $H_2S$, in a Mayes universal testing machine by means of bars extending through the holes H1 and H2. The specimen was then subjected, at room temperature, to a slow straining test by applying a gradually increasing load so as to tend to pull the two limbs of the specimen apart and that was continued until failure, with the testing machine automatically recording a load displacement curve. The apparent stress intensity at failure $K_Q$ ($MN.m^{-1.5}$), the total energy required for fracturing the specimen (J), and the average fracture energy per unit area of the geometric fracture surface ($J.mm^{-2}$) were calculated from the load displacement curve. The results obtained are given in Table 8, which also gives the loading rate ($MN.m^{-1.5}.h^{-1}$)

TABLE 8

| Type of specimen | Loading rate | $K_Q$ | Total fracture energy | Average Fracture energy |
|---|---|---|---|---|
| Invention | 4.91 | 53.00 | 15.13 | $452.9 \times 10^{-4}$ |
| Comparison | 4.25 | 43.64 | 10.8 | $314.6 \times 10^{-4}$ |

It can be seen from the results shown in the table that the strength of the specimen provided with the $MoS_2$ coating is better than that of the comparison specimen. (Although the loading rate for the comparison specimen was lower than that for the other specimen, the difference is not considered significant, both rates being very low, and occurs merely because of practical difficulties in achieving identical rates.)

Figure 4:
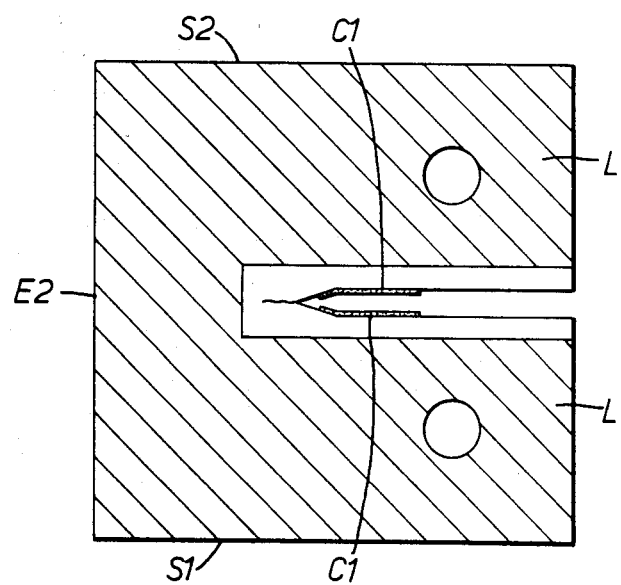

It was thought that the presence of the active sulphide coating C2 in front of the crack F might physically inhibit the crack from extending thus giving the specimen according to the invention, shown in FIG. 2a, an unfair advantage over the comparison specimen shown in FIG. 3. Further tests were therefore carried out using three specimens according to the invention, provided only with the $MoS_2$/FEP coating C1 of the type described above (the coating C2 being omitted) and a Lacomit coating L on the major faces as shown in FIG. 4 (the coating extending over the whole of each face except for a region 22 mm long and 1.5 mm either side of the notch N), the end faces E1, E2 and the side faces S1, S2 also carrying a Lacomit coating as described for the first specimen mentioned above. Two comparison specimens were also tested: those were identical to the three specimens according to the invention (as shown in FIG. 4) but with the omission of the coatings C1.

The tests were carried out in the same manner as described above and the results are summarised in Table 9.

TABLE 9

| Type of specimen | Loading rate | $K_Q$ | Total fracture energy | Average fracture energy |
|---|---|---|---|---|
| Invention | 5.70 | 50.08 | 9.90 | $323.3 \times 10^{-4}$ |
| | 6.84 | 54.50 | 12.51 | $444.0 \times 10^{-4}$ |
| | 5.05 | 50.08 | 12.67 | $377.8 \times 10^{-4}$ |
| Comparison | 4.56 | 47.45 | 8.81 | $276.4 \times 10^{-4}$ |
| | 3.31 | 46.73 | 7.70 | $271.9 \times 10^{-4}$ |

Those results again show that the specimens provided with the $MoS_2$ coatings are of improved strength as compared with the comparison specimens.

In carrying out the above tests it was found that hydrogen gas evolved on the coatings C1 sometimes tended to become trapped in the notch N thus preventing the NACE solution from reaching the crack F. Another difficulty was that it was difficult to ensure constant quality and thickness of the coatings C1 on the inner walls of the notch N.

Figure 5:
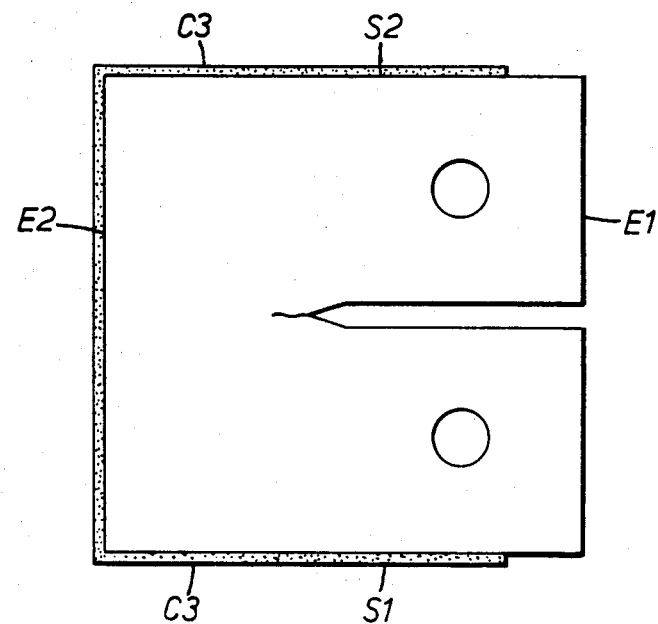

Further tests were carried out using specimens each provided with a coating C3, of ball-milled $MoS_2$ and FEP in a ratio of 1:0.85, over the whole of the end face E2 and over the major part of each side face S1 and S2 only, as shown in FIG. 5 (the edges of the coating C3 on the side faces S1, S2 being 5 mm from the corners with the end face E1). No coating was present on either major surface of each specimen, nor on the end face E1. Comparison samples coated in an identical manner but with Lacomit instead of $MoS_2$/FEP were also tested.

The tests were carried out as described above, except that the specimens and the $H_2S$-saturated NACE solutions were maintained at the temperatures (°C.) indicated in Table 10 instead of at room temperature. The results are summarised in Table 10.

TABLE 10

| Type of specimen and temperature | Loading rate | $K_Q$ | Total fracture energy | Average fracture energy |
|---|---|---|---|---|
| Invention | | | | |
| 40 | 3.06 | 52.26 | 12.30 | $365.3 \times 10^{-4}$ |
| 60 | 3.98 | 54.60 | 13.66 | $397.9 \times 10^{-4}$ |
| 60 | 2.53 | 57.09 | 14.00 | $416.5 \times 10^{04}$ |
| Comparison | | | | |
| 20 | 4.49 | 46.91 | 10.78 | $314.8 \times 10^{-4}$ |
| 40 | 5.70 | 48.86 | 9.81 | $293.9 \times 10^{-4}$ |
| 60 | 3.01 | 50.07 | 8.64 | $266.9 \times 10^{-4}$ |
| 60 | 4.10 | 49.96 | 9.86 | $290.0 \times 10^{-4}$ |

The preparation of the coated specimens and the quality control of the coating was much easier using the specimens of the type illustrated in FIG. 5, and the results given in Table 10 show that the $MoS_2$ coating is still effective even when situated away from the crack F. In those specimens, the ratio of coated surface to exposed steel surface was about 1:2.7; a ratio of between 1:2 and 1:3 is considered suitable.

A further set of specimens, coated as described above with reference to FIG. 5, but with the coating comprising $MoS_2$ as supplied (without ball-milling) and FEP in a ratio of 1:1.12 was tested in the same manner. The results are summarised in Table 11 and may be compared with the comparison results listed in Table 10.

TABLE 11

| Temperature | Loading rate | $K_Q$ | Total fracture energy | Average fracture energy |
|---|---|---|---|---|
| Invention | | | | |
| 20 | 6.14 | 54.43 | 16.0 | $461.7 \times 10^{-4}$ |
| 40 | 3.88 | 51.02 | 13.2 | $380.7 \times 10^{-4}$ |
| 60 | 4.59 | 58.19 | 13.82 | $398.7 \times 10^{-4}$ |

The coating composition used in the last set of tests had the advantage of giving a denser and stronger coating. The results given in Table 11 show that the strength properties of the specimens are not adversely affected by the use of $MoS_2$ of lower specific surface area nor by the reduction in the proprtion of $MoS_2$ in the coating.

The size of the specimens of pipe steel, which has a high ductility, used in this example are too small to give valid stress intensity values but they enable qualitative comparison of the values of $K_Q$ and fracture energy between the specimens coated according to the invention and the comparison specimens. Nevertheless, the results of these tests clearly show that the coating according to the invention improves the mechanical behaviour of the metal in a corrosive environment.

EXAMPLE 8

Tests coupons of G1 special steel were notched, heat-treated, quenched, tempered, polished and cracked as described in Example 5, and in accordance with British Standard 5447 (April 1977).

One set of specimens was then coated with $MoS_2$ (which had not been ball-milled)/FEP (1:1.12) as described in Example 7 with reference to FIG. 5, and a second comparison set was coated similarly but with Lacomit. The specimens were then tested, at room temperature as described in Example 7.

Additionally, after failure of the specimen, the percentage of ductile fracture area, based on the whole fracture area, was assessed using a scanning electron microscope.

The results, which are summarised in Table 12, show that the specimens coated according to the invention showed a much higher proportion of ductile fracture, which agrees with the higher values achieved for $K_Q$ and fracture energy. These results confirm those achieved in Example 7.

TABLE 12

| Type of specimen | Loading rate | $K_Q$ | Total fracture energy | Average fracture energy | ductile fracture |
|---|---|---|---|---|---|
| Invention | 1.49 | 53.32 | 1.09 | $103.8 \times 10^{-4}$ | 3 |
| | 1.22 | 57.40 | 1.53 | $84.4 \times 10^{-4}$ | 4 |
| | 1.34 | 50.74 | 1.17 | $91.5 \times 10^{-4}$ | 5 |
| Comparison | 1.40 | 55.59 | 1.03 | $46.8 \times 10^{-4}$ | |
| | 1.36 | 58.40 | 1.63 | $61.5 \times 10^{-4}$ | 2 |
| | 1.75 | 57.04 | .10 | $47.9 \times 10^{-4}$ | 2 |

We claim:

1. A method of protecting a metal substrate in a corrosive environment against hydrogen embrittlement, which comprises providing, in the vicinity of the substrate and in electrical connection therewith, an active substance comprising a metallic sulphide or mixed sulphide containing metallic atoms of at least one metal selected from molybdenum and tungsten.

2. A method as claimed in claim 1, wherein the active substance comprises at least one compound selected from the group consisting of molybdenum sulphide, tungsten sulphide, and molybdenum/tungsten mixed sulphides.

3. A method as claimed in claim 1, wherein the active substance comprises a mixed sulphide of at least one element selected from a first group consisting of molybdenum and tungsten and at least one metal selected from a second group consisting of nickel, iron, manganese, cobalt and the rare earth metals.

4. A method as claimed in claim 1, wherein the active substance has a specific surface area of at least 2 m²/g.

5. A method as claimed in claim 4, wherein the active substance has a specific surface area of at least 4 m²/g.

6. A method as claimed in claim 1, wherein the active substance is used in an amount within the range of from 1 to 15 mg per cm² of the metal substrate.

7. A method as claimed in claim 6, wherein the active substance is used in an amount within the range of from 2 to 10 mg per cm² of the metal substrate.

8. A method as claimed in claim 7, wherein the active substance is used in an amount within the range of from 4 to 6 mg per cm² of the metal substrate.

9. A method as claimed in claim 1, wherein the real surface area of the active substance is at least 5 times the geometric surface area of the metal substrate.

10. A method as claimed in claim 9, wherein the real surface area of the active substance is at least 10 times the geometric surface area of the metal substrate.

11. A method as claimed in claim 1, wherein the active substance is applied as, or is incorporated in, a coating on the surface of the substrate.

12. A method as claimed in claim 11, wherein the coating comprises a dispersion of the active substance in a suitable binder.

13. A method as claimed in claim 12, wherein the binder is chemically inert.

14. A method as claimed in claim 13, wherein the binder is a fluorinated olefin polymer.

15. A method as claimed in claim 14, wherein the binder is polytetrafluoroethylene or another fluorinated ethylene polymer.

16. A method as claimed in claim 12, wherein the coating comprises from 10 to 100% by weight of the binder, based on the weight of the active substance.

17. A method as claimed in claim 16, wherein the coating comprises from 20 to 60% by weight of the binder, based on the weight of the active substance.

18. A method as claimed in claim 9, wherein the coating has a thickness within the range of from 0.001 cm to 0.01 cm.

19. A method as claimed in claim 9, wherein an additional protective coating is provided over the coating comprising the active substance.

20. A method as claimed in claim 19, wherein the protective coating is a non-conducting impervious coating.

21. A method as claimed in claim 20, wherein the protective coating comprises an epoxy resin.

22. A method as claimed in claim 1, wherein the active substance is incorporated in a separate member in electrical connection with the metal substrate.

23. A method as claimed in claim 1, wherein the active substance is provided in the form of a fluid dispersion which passes over the surface of the metal substrate.

24. A method as claimed in claim 1, wherein the metal substrate is an iron or steel substrate.

25. A method as claimed in claim 24, wherein the metal substrate is a pipeline or a part thereof.

26. A method as claimed in claim 1, wherein the corrosive environment is one in which sour corrosion occurs.

27. A metal substrate for use in a corrosive environment, said substrate having, in electrical connection therewith, an active substance comprising a metallic sulphide or mixed sulphide containing metallic atoms of at least one metal selected from molybdenum and tungsten.

28. A metal substrate as claimed in claim 27, wherein the active substance comprises molybdenum sulphide and/or tungsten sulphide.

29. A metal substrate as claimed in claim 27, wherein the active substance has a specific surface area of at least 2 $m^2/g$.

30. A metal substrate as claimed in claim 27, wherein the active substance is present in an amount within the range of from 1 to 15 mg per $cm^2$ of the metal substrate.

31. A metal substrate as claimed in claim 30, wherein the real surface area of the active substance is at least 5 times the geometric surface area of the metal substrate.

32. A metal substrate as claimed in claim 27 which is coated with a composition comprising the active substance.

33. A metal substrate as claimed in claim 32, wherein the coating comprising the active substance is provided with a protective overcoating.

34. A metal substrate as claimed in claim 27, wherein the metal substrate is an iron or steel substrate.

35. A gas or oil pipeline component at least part of the surface of which is provided with a first coating comprising an active substance comprising a metallic sulphide or mixed sulphide containing metallic atoms of at least one metal selected from molybdenum and tungsten and a second, protective, non-conductive and impervious coating over said first coating.

36. A gas or oil pipeline component as claimed in claim 35, wherein the active substance is dispersed in an inert polymer binder.

37. A gas or oil pipeline component as claimed in claim 35, wherein the protective coating comprises an epoxy resin.

* * * * *